UNITED STATES PATENT OFFICE.

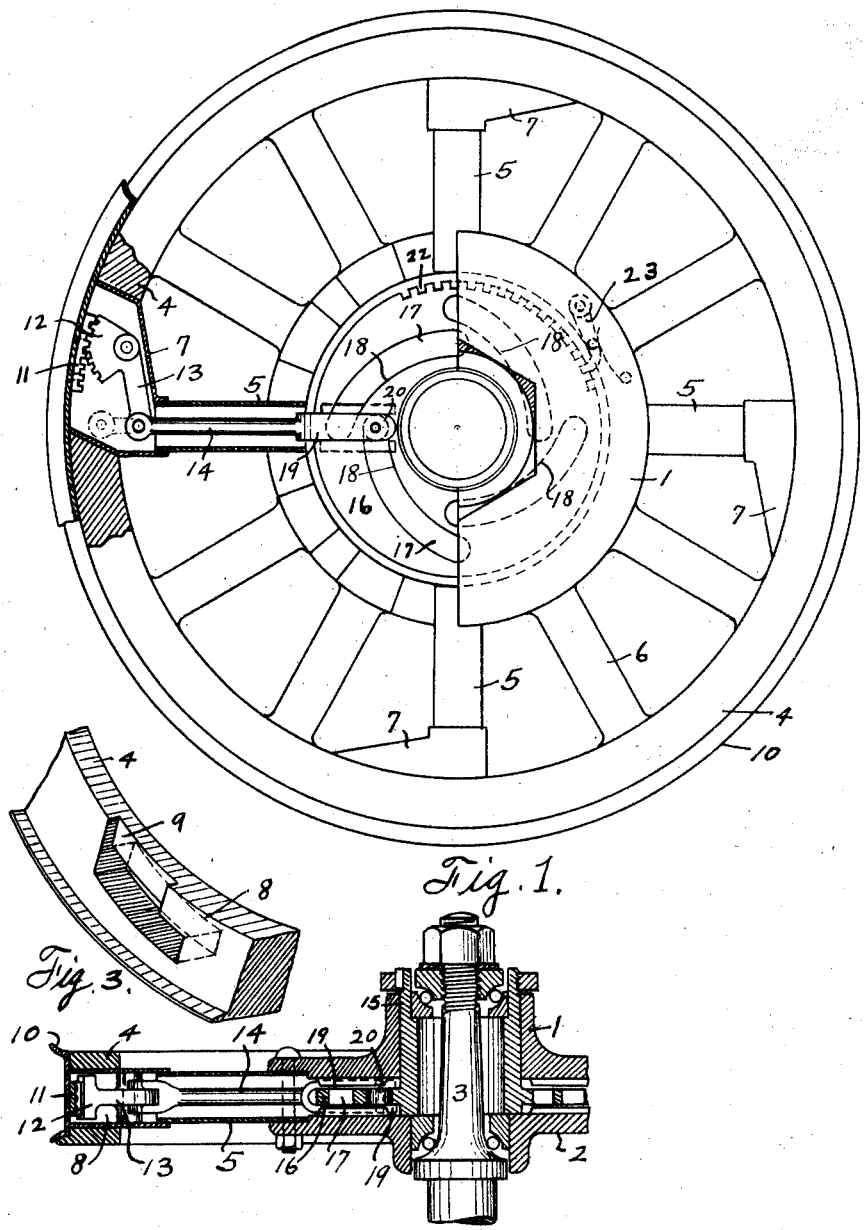

CHRISTIAN H. LARSON, OF GUFFEY, TEXAS.

VEHICLE-WHEEL.

1,401,414.   Specification of Letters Patent.   Patented Dec. 27, 1921.

Application filed May 7, 1921. Serial No. 467,645.

*To all whom it may concern:*

Be it known that I, CHRISTIAN H. LARSON, a citizen of the United States, residing at Guffey, in the county of Jefferson and State of Texas, have invented certain new and useful Improvements in a Vehicle-Wheel, of which the following is a specification.

This invention relates to new and useful improvements in a vehicle wheel.

One object of the invention is to provide a wheel provided with a demountable tire rim and equipped with means for quickly and easily demounting said rim. The wheel herein described is specially designed to be equipped with a pneumatic tire and is so constructed that the tire may be readily mounted and demounted.

With the above and other objects in view this invention has particular relation to certain novel features of construction, operation and arrangement of parts, an example of which is given in this specification and illustrated in the accompanying drawings, wherein:—

Figure 1 shows a side view of the wheel, partially in section.

Fig. 2 is a fragmentary transverse sectional view, taken on the line 2—2 of Fig. 1, and Fig. 3 shows a fragmentary perspective view of the wheel felly.

Referring now more particularly to the drawings, the numeral 1 designates the outer hub plate and the numeral 2 designates the inner hub plate, forming the hub of the wheel which receives the spindle 3. The inner ends of the spokes are secured between these plates and their outer ends support the felly 4. Some of the spokes, preferably four, are formed tubular, and arranged a uniform distance apart around the wheel. These spokes are designated by the numerals 5. The other spokes 6 are of conventional form. The outer ends of the spokes 5 are enlarged and formed into hoods 7, which are secured to the felly, and form housings for the operative mechanism inclosed by them. The felly, opposite each hood 7, has a slot 8 cut therethrough which tapers rearwardly, and the outer side of the felly at the forward end of each slot has the notches 9. The numeral 10 designates the tire rim which has internal projections 11 spaced apart therearound to coincide with the slots 8. These projections are formed into rack members. In mounting the rim it is positioned, relative to the wheel so that the projections 11 will pass through the notches 9 and the rim is then turned to cause said projections to wedge in the rear ends of the slots 8.

Pivoted within the hoods 7 are the rack members 12 which are in mesh with the corresponding members 11. Each rack member 12 is formed with a lateral arm 13 which is pivoted to the outer end of the push rod 14. These rods are inclosed by their corresponding spokes 5.

Within the hub of the wheel there is a sleeve 15 which has a bearing within the end plate 1 and this sleeve is formed with a disk 16, which works between the hub end plates. This disk has the slots 17 cut therethrough whose inner sides form the cam faces 18, said slots corresponding in number and arrangement to the spokes 5. The inner end of each push rod is bifurcated, forming the spaced fingers 19 which embrace the disk 16 and mounted between the fingers of each rod, and working in the corresponding slots there are the roller bearings 20. The end of the sleeve 15 projects out beyond the outer end of the hub and has a nut 21 splined thereon to receive a wrench. When it is desired to demount the rim the sleeve and disk are turned forwardly and the cam faces 18 will press against the rollers 20 and force the rods 14 outwardly. This will operate through the arms 13 to rotate the rack members 12 which will in turn carry the rim around and aline the projections 11 opposite the notches 9 and the rim may then be pulled off. When the rim is remounted the projections 11 may be seated in the slots 8 by a reverse rotation of the sleeve 15. A section of the rim of the disk 16 is formed with rack teeth 22, in which the spring pressed dog 23 engages to prevent the release of the tire rim when the vehicle is run backwardly.

What I claim is:—

1. A wheel having a felly formed with seats, a rim mounted on the felly and formed with projections which normally rest in said seats, an actuating device formed in the wheel hub, and operative connections between said device and the rim, whereby rotation of the former is imparted to the latter.

2. A wheel having a felly formed with seats, a rim mounted on the felly and formed with projections which normally rest in said seats, an actuating device formed in the wheel hub, and operative connections between said device and the rim, whereby rotation of the former is imparted to the latter, whereby the projections of the rim are unseated from the felly 3. A wheel having a felly formed with oblong slots provided with lateral notches, a rim provided with internal projections adapted to pass through said notches and seat in said slots, a mechanism carried by the wheel and operatively connected with the rim, whereby it may be turned in either direction to seat said projections in or unseat them from said slots, said means including a rack member in operative connection with said projections, a rotary member within the wheel hub, and push rods, connected to and actuated by said rotary member and operatively connected to said rack members and actuating the same.

In testimony whereof I have signed my name to this specification in the presence of two subscribing witnesses.

CHRISTIAN H. LARSON.

Witnesses.
E. V. HARDWAY,
A. BOSS-KOEFOED.